US012711449B2

(12) United States Patent
Farre Guiu et al.

(10) Patent No.: US 12,711,449 B2
(45) Date of Patent: Aug. 18, 2026

(54) TAGGING PERFORMANCE EVALUATION AND IMPROVEMENT

(71) Applicant: Disney Enterprises, Inc., Burbank, CA (US)

(72) Inventors: Miquel Angel Farre Guiu, Bern (CH); Marcel Porta Valles, Balaguer (ES); Marc Junyent Martin, Barcelona (ES); Jordi Badia Pujol, Madrid (ES); Melina Ovanessian, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 66 days.

(21) Appl. No.: 17/166,911

(22) Filed: Feb. 3, 2021

(65) Prior Publication Data

US 2022/0245554 A1 Aug. 4, 2022

(51) Int. Cl.
*G06F 40/169* (2020.01)
*G06Q 10/0639* (2023.01)

(52) U.S. Cl.
CPC ..... *G06Q 10/06395* (2013.01); *G06F 40/169* (2020.01)

(58) Field of Classification Search
None
See application file for complete search history.

(56) References Cited

U.S. PATENT DOCUMENTS 8,745,026 B1 * 6/2014 Mosterman ......... G06F 16/9535 707/708
9,058,317 B1 * 6/2015 Gardner ................ G06F 40/268
9,464,226 B2 * 10/2016 Sakata ............... C09K 11/7728
10,057,644 B1 8/2018 Farre Guiu et al.
10,489,722 B2 11/2019 Farre Guiu et al.
10,650,929 B1 * 5/2020 Beck ...................... G16H 30/40
11,030,482 B2 * 6/2021 Hayashi ................... G06N 3/08
11,281,940 B2 * 3/2022 Toyoda .................. G06V 20/10
11,907,650 B2 * 2/2024 Wilson .................. G06F 3/0482
11,978,273 B1 * 5/2024 Ramaswamy ......... G06V 10/82
12,432,277 B2 * 9/2025 Laughton .............. G06F 16/219
2005/0027664 A1 * 2/2005 Johnson .................. G06F 40/45 706/12
2012/0114199 A1 * 5/2012 Panyam .............. G06F 16/5866 382/118
2016/0350655 A1 * 12/2016 Weiss ..................... G06N 3/044
(Continued)

*Primary Examiner* — Folashade Anderson
(74) *Attorney, Agent, or Firm* — Farjami & Farjami LLP

(57) ABSTRACT

According to one implementation, a tagging performance evaluation system includes a computing platform having a hardware processor and a memory storing a software code. The hardware processor is configured to execute the software code to receive annotation data identifying content, annotation tags applied to the content, and one or more correction(s) to the annotation tags, to perform, using the annotation data, at least one of an evaluation of a tagging process resulting in application of the annotation tags to the content or an assessment of a correction process resulting in the correction(s), and to identify, based on the at least one of the evaluation or the assessment, one or more parameters for improving at least one of the tagging process or the correction process. At least one of the evaluation or the assessment is performed using a machine learning model of the tagging performance evaluation system.

14 Claims, 6 Drawing Sheets

(56) References Cited

U.S. PATENT DOCUMENTS

2019/0045277 A1* 2/2019 Petrillo ................ H04N 21/854
2019/0384303 A1* 12/2019 Muller ............... G01C 21/3407
2020/0005170 A1* 1/2020 Priel ....................... G06F 21/56
2020/0034656 A1* 1/2020 Shi ..................... G06Q 30/0631
2020/0074224 A1* 3/2020 Hayashi .................... G06F 3/14
2020/0293712 A1* 9/2020 Potts ..................... G06F 40/169
2020/0380209 A1* 12/2020 Cai ....................... G06F 40/295
2020/0395119 A1* 12/2020 Lyman ................. G06Q 10/105
2021/0192385 A1* 6/2021 Farré Guiu ............ G06V 20/41
2021/0224997 A1* 7/2021 Kushida .................. G06T 5/001
2021/0274255 A1* 9/2021 Aher .................. H04N 21/4316
2021/0312227 A1* 10/2021 Moradiannejad ..... G06F 18/214
2024/0062019 A1* 2/2024 Aberle .................. G06F 40/169

* cited by examiner

Fig. 1

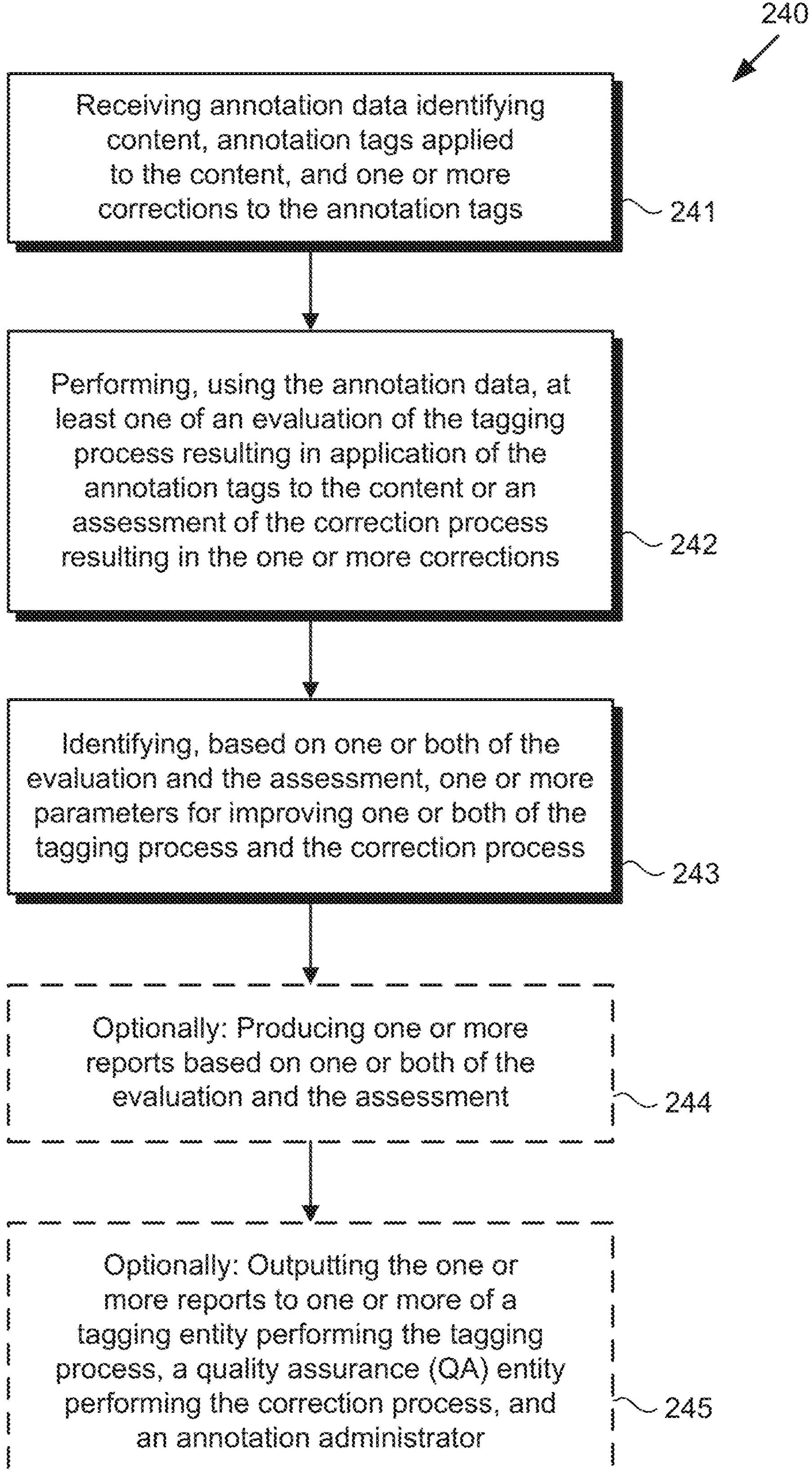
Fig. 2
240
Receiving annotation data identifying content, annotation tags applied to the content, and one or more corrections to the annotation tags
241
Performing, using the annotation data, at least one of an evaluation of the tagging process resulting in application of the annotation tags to the content or an assessment of the correction process resulting in the one or more corrections
242
Identifying, based on one or both of the evaluation and the assessment, one or more parameters for improving one or both of the tagging process and the correction process
243
Optionally: Producing one or more reports based on one or both of the evaluation and the assessment
244
Optionally: Outputting the one or more reports to one or more of a tagging entity performing the tagging process, a quality assurance (QA) entity performing the correction process, and an annotation administrator
245

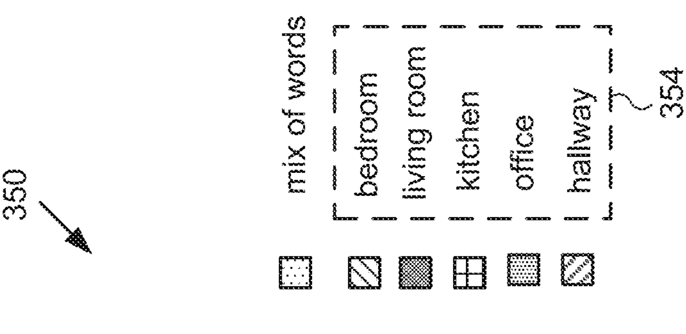
350
mix of words
bedroom
living room
kitchen
office
hallway
354
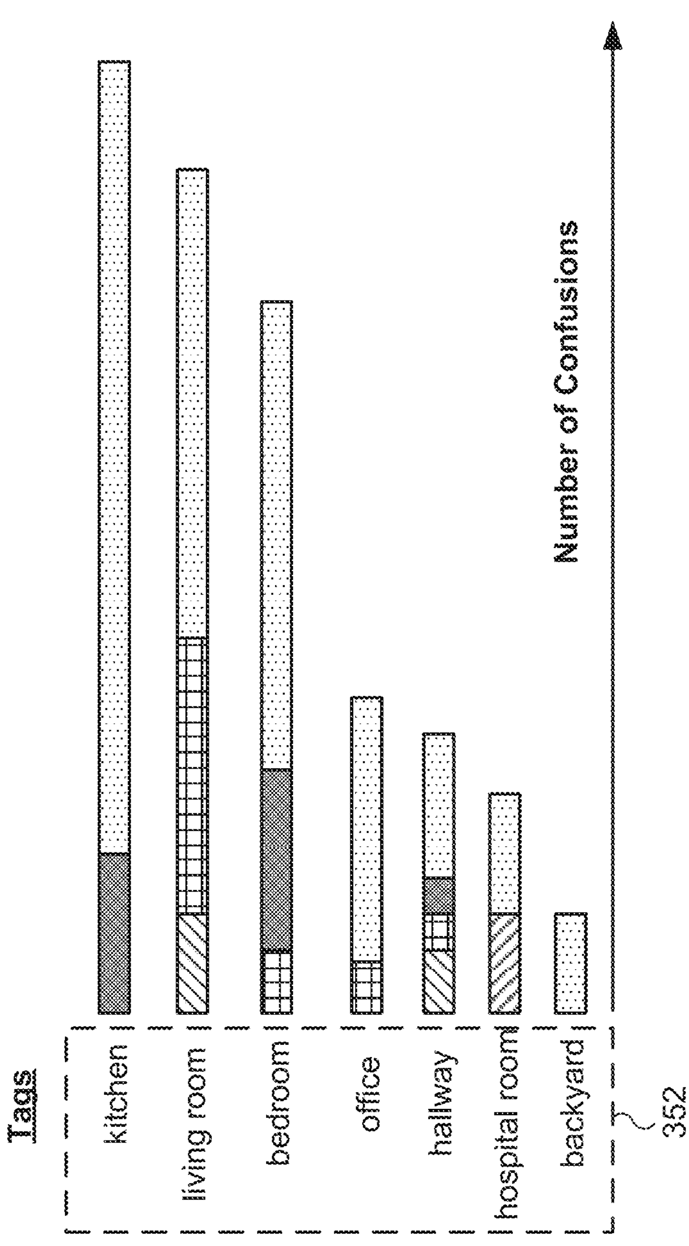
Tags
kitchen
living room
bedroom
office
hallway
hospital room
backyard
352
Number of Confusions
Fig. 3

| Type of Report | Circumstances | Report to Tagger 428A |
|---|---|---|
| Tagger feedback | High number or percentage of added tags by QA reviewer. All missing tags are a specific term or specific terms. | Your QA reviewer reminds you that "reading" and "studying" are terms that are commonly missing in your tags. Please pay special attention to them. |
| Tagger feedback | High number or percentage of corrections to tags applied by tagger. | Your QA reviewer suggests that you use the more specific tags "Cattleman's Ranch Steakhouse" or "Huang family house" instead of the generic tag "house" when possible. |

| Type of Report | Circumstances | Report to QA Reviewer 428B |
|---|---|---|
| QA notification | High number or percentage of rejected tags, many of which are duplicates. | It is alright to have duplicated tags. Please do not reject duplicated tags. |
| QA notification | High number or percentage of rejected tags where the tags applied by the tagger are wrong. | Notify the tagger of the tagging errors. |
| QA notification | High number or percentage of accepted tags. | The number of accepted tags is high in comparison to previous tasks. Are you sure? |

| Worker | Tagging Performance | Performance as QA Reviewer | Report to Annotation Administrator 428C |
|---|---|---|---|
| Jennifer | Receives fewer than an average or predetermined threshold number or percentage of corrections to tags. | Makes more than or equal to an average or predetermined threshold number or percentage of corrections to tags. | May skip QA review when tagging is performed by this worker. |
| Pablo | Receives more than or equal to an average or predetermined threshold number or percentage of corrections to tags. | Applies fewer than an average or predetermined threshold number or percentage of corrections to tags. | This worker requires more training before allowing this worker to perform more QA review. |
| Javier | Receives fewer than an average or predetermined threshold number or percentage of corrections to tags. | No experience performing QA. | Consider promoting this worker to QA reviewer. |

Fig. 4C

TAGGING PERFORMANCE EVALUATION AND IMPROVEMENT

BACKGROUND

Due to its popularity as a content medium, ever more video is being produced and made available to users. As a result, the efficiency with which video content can be annotated, i.e., "tagged," and managed has become increasingly important to the producers of that video content. For example, annotation of video is an important part of the production process for television (TV) programming content and movies.

Tagging of video has traditionally been performed manually by human taggers, while quality assurance (QA) for the tagging process is typically performed by human QA reviewers. However, in a typical video production environment, there may be such a large number of videos to be annotated that manual tagging and review become impracticable. In response, various automated systems for performing content tagging and QA review have been developed or are in development. While offering efficiency advantages over traditional manual techniques, automated systems, like human taggers and QA reviewers, are prone to error. Consequently, there is a need in the art for automated systems and methods for evaluating and improving the performance of the tagging and QA review processes performed as part of content annotation.

BRIEF DESCRIPTION OF THE DRAWINGS

FIG. 1 shows a diagram of an exemplary tagging performance evaluation system, according to one implementation;

FIG. 2 shows a flowchart presenting an exemplary method for use by a tagging performance evaluation system, according to one implementation;

FIG. 3 shows a diagram depicting evaluation of tag confusion among a predetermined taxonomy of tags, according to one implementation;

FIG. 4A shows a table including the contents of exemplary reports produced by the tagging performance evaluation system of FIG. 1 for a human or automated tagger, according to one implementation;

FIG. 4B shows a table including the contents of exemplary reports produced by the tagging performance evaluation system of FIG. 1 for a human or automated quality assurance (QA) reviewer, according to one implementation; and FIG. 4C shows a table including the contents of exemplary reports produced by the tagging performance evaluation system of FIG. 1 for an annotation administrator, according to one implementation.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions. The present application discloses tagging performance evaluation systems and methods that overcome the drawbacks and deficiencies in the conventional art. It is noted that although the present solution is described below in detail by reference to the exemplary use case of content annotation, the present novel and inventive principles may more generally find other applications to increasing automation and efficiency for a variety of classification and quality assurance (QA) processes. For example, the present novel and inventive concepts may be applied to an image or groups of images, as well as other fields such as agricultural video annotation or music audio track annotation.

It is further noted that, as used in the present application, the terms "automation," "automated," and "automating" refer to systems and processes that do not require human intervention. Although, in some implementations, a human system administrator may review or even modify tagging decisions or QA determinations made by the tagging performance evaluation systems described herein, that human involvement is optional. Thus, in some implementations, the tagging performance evaluation systems and methods described in the present application may be performed under the control of hardware processing components executing them.

Moreover, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs).

A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing or natural-language processing.

Figure 1:
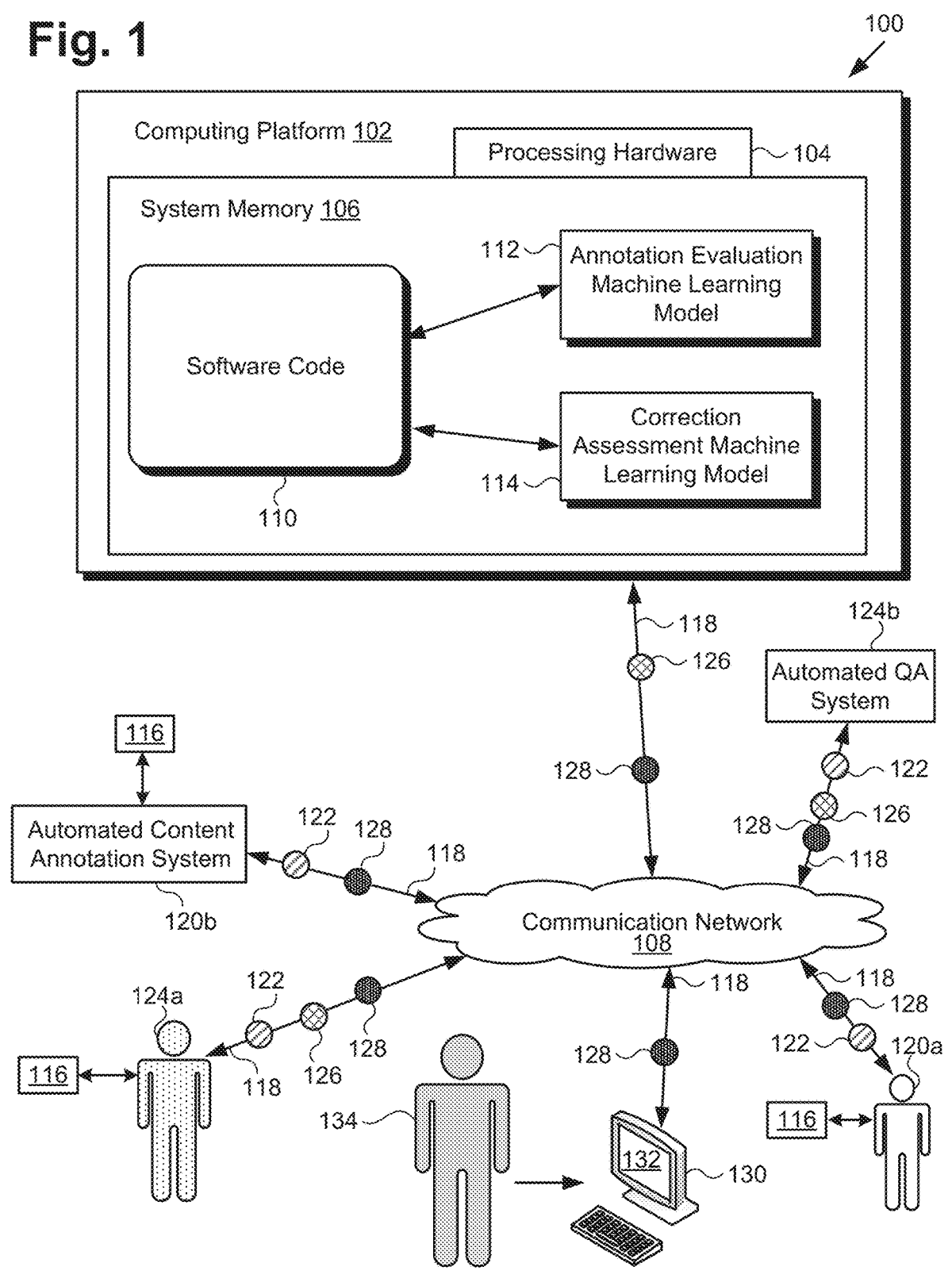

FIG. 1 shows a diagram of exemplary tagging performance evaluation system 100, according to one implementation. Tagging performance evaluation system 100 includes computing platform 102 having processing hardware 104, and system memory 106 implemented as a non-transitory storage device. As shown in FIG. 1, according to one implementation, system memory 106 stores software code 110, annotation evaluation machine learning model 112, and correction assessment machine learning model 114.

As further shown in FIG. 1, tagging performance evaluation system 100 may be implemented in a use environment including one or both of human tagger **120*a* and automated content annotation system 120*b*, one or both of human QA reviewer 124*a* and automated QA system 124*b*, and peripheral system 130 including display 132. According to the exemplary implementation shown in FIG. 1, peripheral system 130 is utilized by annotation administrator 134 to interact with tagging performance evaluation system 100 via communication network 108 and network communication links 118. Also shown in FIG. 1 are content 116 undergoing annotation, annotation tags 122 applied to content 116 during a process, annotation data 126 including annotation tags 122 as well as corrections to annotation tags 122 made during QA review, and one or more reports 128 (hereinafter "report(s) 128") generated by tagging performance evaluation system 100**.

With respect to the representation of tagging performance evaluation system 100 shown in FIG. 1, it is noted that although software code 110, annotation evaluation machine learning model 112, and correction assessment machine learning model 114 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as processing hardware 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110, annotation evaluation machine learning model 112, and correction assessment machine learning model 114 as being mutually co-located in system memory 106, that representation is also merely provided as an aid to conceptual clarity. More generally, tagging performance evaluation system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within tagging performance evaluation system 100. Thus, it is to be understood that software code 110, annotation evaluation machine learning model 112, and correction assessment machine learning model 114 may be stored remotely from one another within the distributed memory resources of tagging performance evaluation system 100.

It is further noted that, in some implementations, one or both of annotation evaluation machine learning model 112 and correction assessment machine learning model 114 may take the form of software modules included in software code 110. However, in other implementations, one or both of annotation evaluation machine learning model 112 and correction assessment machine learning model 114 omitted from tagging performance evaluation system 100 and the functionality attributed to those features may be performed by software code 110.

Processing hardware 104 may include multiple hardware processing units, such as one or more central processing units, one or more graphics processing units, and one or more tensor processing units. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network.

Although peripheral system 130 is shown as a desktop computer in FIG. 1, that representation is provided merely as an example as well. More generally, peripheral system 130 may be any suitable mobile or stationary computing device or system that includes display 132 and implements data processing capabilities sufficient to implement the functionality ascribed to peripheral system 130 herein. For example, in other implementations, peripheral system 130 may take the form of a laptop computer, tablet computer, or smartphone, for example. Moreover, although FIG. 1 shows single peripheral system 130 in the interests of conceptual clarity, one or both of human tagger 120*a* and human QA reviewer 124*a* may utilize peripheral systems corresponding to peripheral system 130 in order to interact with content 116 and to communicate with tagging performance evaluation system 100 via communication network 108 and network communication links 118.

With respect to display 132 of peripheral system 130, display 132 may be physically integrated with peripheral system 130 or may be communicatively coupled to but physically separate from peripheral system 130. For example, where peripheral system 130 is implemented as a smartphone, laptop computer, or tablet computer, display 132 will typically be integrated with peripheral system 130. By contrast, where peripheral system 130 is implemented as a desktop computer, display 132 may take the form of a monitor separate from peripheral system 130 in the form of a computer tower. Furthermore, display 132 of peripheral system 130 may be implemented as a liquid crystal display (LCD), a light-emitting diode (LED) display, an organic light-emitting diode (OLED) display, a quantum dot (QD) display, or any other suitable display screen that performs a physical transformation of signals to light.

By way of overview, the present tagging performance evaluation systems and methods ensure that taggers, QA reviewers, and annotation administrators gain valuable insights into the accuracy and efficiency of tagging and correction processes. In addition, the present tagging performance evaluation systems and methods enable annotation administrators to appraise the taxonomy of tags used for content annotation. Based on such an appraisal, the annotation administrators may identify changes to the taxonomy for reducing errors due to tag confusion, or, while retaining the original taxonomy, identify tagging rules requiring improvement or additional training to make available to taggers. The objectives of the tagging performance evaluation systems and methods disclosed in the present application may be achieved by combining manual rules, statistics-based rules, one or more machine learning models, and applying those resources to one or both of human taggers and automated content annotation systems, as well as one or both of human QA reviewers and automated QA systems.

Insights can result from taking into account the performance history of each tagger and QA reviewer, whether human or automated, as well as the challenges associated with tagging particular types of content. Based on one or both of an evaluation of a tagging process performed on content 116 and an assessment of a correction process performed during QA review, the present tagging performance evaluation systems and methods identify parameters enabling improvement of one or both of the tagging process and the correction process. Examples of those parameters may include the identity of the human or automated tagging entity applying the annotations, the identity of the human or automated QA entity correcting the applied tags, the number or percentage of applied tags that are corrected, a tagging performance history of the tagging entity, a correction history of the QA entity, and past tagging performed on the same or similar content, to name a few.

It is noted that the tagging performance history of the tagging entity that may be included among the identified parameters described above may itself include the cumulative working time of the tagging entity, the types of tagging tasks completed, the specific tags associated with the tagging tasks completed, and the types of content tagged by the tagging entity. Moreover, the correction history of the QA entity may include the cumulative working time of the QA entity, the types of tagging tasks corrected, the average number or percentage of corrections made when correcting each type of tagging task, and the timing during QA review when corrections are made (i.e., whether corrections to tags tend to be made in bursts).

Manual or statistics-based rules applied to the parameters may provide some insights. For example when a predetermined percentage of tags applied by a tagging entity are corrected during QA review, such as seventy-five percent or more, for example, the performance of the tagging entity may be flagged for closer analysis. By contrast, when no tags or very few tags are corrected, the performance of the QA entity may be flagged for closer analysis.

In addition to the rules-based approach described above, a finer filter may be used to identify performance problems by taking into account how each individual tag is used in a particular tagging process. To accomplish this, for example, the tags applied to a particular segment of content by a particular tagging entity can be compared with tags applied to other segments of the content with the goal of identifying correlations or deviations in tagging behavior. This finer filter level of analysis may be performed using a machine learning model including a Support Vector Machine (SVM), for example, to classify normal versus abnormal tagging behavior.

The outcome of the rules-based and machine learning model analysis may be used to produce one or more informative reports. For example, referring to FIG. 1, report(s) 128 generated for annotation administrator 134 can include a simple summary of the individual tagging or correction processes flagged for further analysis. In response, annotation administrator 134 may visualize the flagged task using display 132 of peripheral system 130 and may decide if the tagging entity or QA entity needs to be corrected or informed. In some use cases, annotation administrator 134 may determine that the flagged process should not have been flagged for further analysis, and may update one or more of software code 110, annotation evaluation machine learning model 112, and correction assessment machine learning model 114 to avoid flagging analogous processes in the future. Alternatively, or in addition, clustering techniques can be used to produce a report highlighting common tagging errors across multiple taggers, such as confusion with specific tags included in the taxonomy of tags. That reported information can be used to modify the taxonomy or provide additional training to taggers identified in the report.

When generated for a QA entity, report(s) 128 may identify tags that might have been misunderstood or have been updated over time. In this use case, manual rules can have added weight because they reflect affirmative tagging determinations made by annotation administrator 134. It is noted that the QA entity is provided the opportunity to justify unusual correction results (for example, many corrections are needed because the work done by the tagging entity is statistically worse than the average). In addition, report(s) 128 can also direct the QA entity to particular segments of the content for further review. For example, if a television (TV) episode has been tagged and had the applied tags corrected during a QA review, but nevertheless a segment of the episode featuring a location identified as "home of character A" fails to include a tag identifying character A as such, report(s) 128 may include instruction that the QA entity re-assess the tags applied to the segment in question.

The functionality of tagging performance evaluation system 100 will be further described by reference to FIG. 2. FIG. 2 shows flowchart 240 presenting an exemplary method for use by tagging performance evaluation system 100, according to one implementation. With respect to the methods outlined in FIG. 2, it is noted that certain details and features have been left out of flowchart 240 in order not to obscure the discussion of the inventive features in the present application.

Referring now to FIG. 2 in combination with FIG. 1, flowchart 240 begins with receiving annotation data 126, annotation data 126 identifying content 116, multiple annotation tags 122 applied to content 116, and one or more corrections to annotation tags 122 (action 241). Content 116 may include images, audio, video, or audio-video (AV) content in the form of one or more TV episodes, movies, animations, video games, audio tracks, music videos, or content artwork for example. Annotation tags 122 may be applied to content 116 in an annotation process performed by one or more tagging entities in the form of human tagger **120*a* or automated content annotation system 120*b*. Automated content annotation system 120*b*, when utilized, may implement a machine learning model, such as an NN trained to apply annotations to content corresponding to content 116, for example. Exemplary implementations of automated content annotation system 120*b*** and its operation are disclosed by U.S. Pat. No. 10,057,644, titled "Video Asset Classification," and issued on Aug. 21, 2018, which is hereby incorporated fully by reference into the present application.

The corrections to annotation tags 122 identified by annotation data 126 may be made by one or more QA entities in the form of human QA reviewer **124*a* or automated QA system 124*b*. Automated QA system 124*b*, when utilized, may implement a machine learning model, such as an NN trained to review and correct annotations applied to content corresponding to content 116. As shown in FIG. 1, annotation data 126 may be received by tagging performance evaluation system 100 via communication network 108 and network communication links 118. Annotation data 126 may be received by software code 110, executed by processing hardware 104 of computing platform 102**.

Flowchart 240 further includes performing, using annotation data 126, at least one of an evaluation of the tagging process resulting in application of annotation tags 122 to content 116 or an assessment of the correction process resulting in the one or more corrections identified by annotation data 126 (action 242). The evaluation of the tagging process may include a comparison of annotation tags 122 with the corrections to those tags identified by annotation data 126, for example. The evaluation of the tagging process, when included in action 242, may be performed by software code 110, executed by processing hardware 104 of computing platform 102. Moreover, in some implementations, as represented in FIG. 1, the evaluation of the tagging process may be performed by software code 110, executed by processing hardware 104, and using annotation evaluation machine learning model 112. In some of those implementations, as noted above, annotation evaluation machine learning model 112 may include an SVM.

In some implementations, the assessment of the correction process, when included in action 242, may be performed using the evaluation of the tagging process described above, in addition to one or more corrections identified by annotation data 126. The assessment of the correction process may include an analysis of the number of corrections to annotation tags 122 identified by annotation data 126, as well as the comparison of annotation tags 122 with the corrections to those annotation tags, for example. The assessment of the correction process, when included in action 242, may be performed by software code 110, executed by processing hardware 104 of computing platform 102. Moreover, in some implementations, as represented in FIG. 1, the assessment of the correction process may be performed by software code 110, executed by processing hardware 104, and using correction assessment machine learning model 114.

Flowchart 240 further includes identifying, based on one or both of the evaluation and the assessment performed in action 242, one or more parameters for improving one or more of the tagging process resulting in application of annotation tags 122 to content 116 or the correction process resulting in the corrections identified by annotation data 126 (action 243). As noted above, examples of the one or more parameters identified in action 243 may include the identity of the human or automated tagging entity applying annotations tags 122 to content 116, the identity of the human or automated QA entity correcting the applied tags, the number or percentage of applied tags that are corrected, the tagging performance history of the tagging entity, the correction performance history of the QA entity, and past tagging performed on the same or similar content, to name a few. Action 243 may be performed by software code 110, executed by processing hardware 104 of computing platform 102.

In implementations in which one or both of the tagging process resulting in annotation tags 122 and the correction process resulting in correction of annotation tags 122 is/are performed by an automated system implementing a machine learning model, such as automated content annotation system 120*b* or automated QA system 124*b*, the one or more parameters identified in action 243 may be used to modify, discard, or substitute the one or more machine learning models. For example, the one or more parameters identified in action 243 may be used to modify a machine learning model implemented by automated content annotation system 120*b* so as to improve the accuracy of the annotation tags applied to content in the future. Alternatively, or in addition, the one or more parameters identified in action 243 may be used to modify a machine learning model implemented by automated QA system 124*b* so as to improve the accuracy of the corrections made to annotation tags in the future. It is noted that exemplary implementations of such machine learning model improvement solutions are provided in U.S. Pat. No. 10,489,722 titled "Semiautomatic Machine Learning Model Improvement and Benchmarking," and issued on Nov. 26, 2019, and which is also incorporated fully by reference into the present application.

In some implementations, annotation tags 122 applied to content 116 may be selected from a predetermined taxonomy of tags. In those implementations, the predetermined taxonomy of tags may be modified using the one or more parameters identified in action 243. Referring to FIG. 3, FIG. 3 shows diagram 350 depicting evaluation of tag confusion among predetermined taxonomy of tags 352, according to one implementation. Also shown in FIG. 3 is legend 354 associating some of the tags included in predetermined taxonomy of tags 352 with specific fill patterns. It is noted that the number of annotation tags included in predetermined taxonomy of tags 352 is limited in the interests of conceptual clarity. In most use cases, predetermined taxonomy of tags 352 may include tens of annotation tags, or hundreds of annotation tags. According to the exemplary use case represented by FIG. 3, the annotation tags "kitchen" and "living room" are confused for a particular content item or content segment. In this particular use case, the content being annotated includes episodes of a TV series set in a home having a combined living room and kitchen space. As a result of the tag confusion revealed by the one or more parameters identified in action 243, predetermined taxonomy of tags 352 can be simplified to include fewer tags, or may be modified through replacement of an existing tag by a new tag. Alternatively, or in addition, the tag confusion revealed by the one or more parameters identified in action 243 may be used to improve the scope of particular tags, or provide additional information or training to taggers in order to reduce tagging errors. As yet another alternative, the tag confusion revealed by the one or more parameters identified in action 243 may result in modification of the machine learning model implemented by automated content annotation system 120*b*, or may result in human tagger 120*a* being provided with additional training.

In some implementations, flowchart 240 may conclude with action 243 described above. However in other implementations, flowchart 240 may further include optionally producing report(s) 128 based on the parameters for improving one or more of the tagging process or the correction process identified in action 243 (action 244). Report(s) 128 may be produced for one or more of the tagging entity performing the tagging process resulting in application of annotation tags 122 to content 116, the QA entity performing the correction process resulting in correction of annotation tags 122, and annotation administrator 134. Report(s) 128 may be produced by software code 110, executed by processing hardware 104 of computing platform 102.

Referring to FIGS. 4A, 4B, and 4C, FIG. 4A shows table 460A including the contents of exemplary reports 428A produced by tagging performance evaluation system 100, in FIG. 1, for human tagger 120*a* or automated content annotation system 120*b*, according to one implementation, while FIG. 4B shows table 460B including the contents of exemplary reports 428B produced for human QA reviewer 124*a* or automated QA system 124*b*, according to one implementation. FIG. 4C shows table 460C including the contents of exemplary reports 428C produced by tagging performance evaluation system 100 for annotation administrator 134, according to one implementation. Reports 428A, 428B, and 428C correspond in general to report(s) 128, in FIG. 1. Thus report(s) 128 may share any of the characteristics attributed to reports 428A, 428B, and 428C by the present disclosure, and vice versa.

As shown in FIG. 4A, in circumstances in which a high number or percentage of tags must be added to annotation tags 122 by the QA entity, whether human or automated, and where the missing tags are the specific terms "reading" and "studying," for example, report 428A to human tagger 120*a* or automated content annotation system 120*b* may read: "Your QA reviewer reminds you that 'reading' and 'studying' are terms that are commonly missing in your tags. Please pay special attention to them." As further shown in FIG. 4A, in circumstances in which a high number or percentage of annotation tags 122 applied to content 116 by human tagger 120*a* or automated content annotation system 120*b* are corrected during QA review, and where the corrected tags are overly generic, reports 428A to human tagger 120*a* or automated content annotation system 120*b* may read: "Your QA reviewer suggests that you use the more specific tags 'Cattleman's Ranch Steakhouse' or 'Huang family house' instead of the generic tag 'house' when possible."

It is noted that reports 428A may be produced manually, or in an automated or semi-automated process. When produced manually, the contents of reports 428A may be input by the QA entity using any suitable input technique, such as by being typed into a report field or entered through use of a voice command, for example. When produced in an automated process, reports 428A may be produced by software code 110, executed by processing hardware 104, and using annotation evaluation machine learning model 112. When produced in a semi-automated process, alternative versions of the content of reports 428A may be predetermined by software code 110, executed by processing hardware 104, and may be displayed to human QA reviewer 124*a*. In that implementation, tagging performance evaluation system 100 may receive a selection input from human QA reviewer 124*a* identifying one of the predetermined report contents for inclusion in reports 428A.

As shown in FIG. 4B, in circumstances in which the corrections to annotation tags 122 made by human QA reviewer 124*a* or automated QA system 124*b* include a high number or percentage of tag rejections, and where many of the rejected tags are duplicates, report 428B to human QA reviewer 124*a* or automated QA system 124*b* may read: "It is alright to have duplicated tags. Please do not reject duplicated tags." As further shown in FIG. 4B, in circumstances in which the corrections to annotation tags 122 made by human QA reviewer 124*a* or automated QA system 124*b* include a high number or percentage of tag rejections, and where the tags applied by human tagger 120*a* or automated content annotation system 120*b* are wrong, report 428B may instruct human QA reviewer 124*a* or automated QA system 124*b* to inform human tagger 120*a* or automated content annotation system 120*b* of the tagging errors.

As also shown in FIG. 4B, where there are a high number or percentage of accepted tags, i.e., few of annotation tags 122 applied by human tagger 120*a* or automated content annotation system 120*b* are corrected by human QA reviewer 124*a* or automated QA system 124*b*, report 428B to human QA reviewer 124*a* or automated QA system 124*b* may read: "The number of accepted tags is high in comparison to previous tasks. Are you sure?" It is noted that reports 428B may be produced in an automated process. When produced in an automated process, reports 428B may be produced by software code 110, executed by processing hardware 104, and using correction assessment machine learning model 114.

It is emphasized that the contents of the reports depicted in FIGS. 4A and 4B, as well as those discussed below by reference to FIG. 4C result from merely exemplary underlying tagging rules that may vary within the same content annotation system depending on the content undergoing annotation. Examples of other messages included in reports 428A to human tagger 120*a* or automated content annotation system 120*b* may read "try to limit your tags to one per content segment," (in subjective tagging cases for instance), or "try to place your tags so as to coincide with the first appearance of a person or object on screen."

As shown in FIG. 4C, reports 428C to annotation administrator 134 may include performance evaluations and suggestions for human taggers and QA reviewers. For example, the human worker identified as "Jennifer" has a performance history as a tagger and a performance history as a QA reviewer. As a tagger, Jennifer receives fewer than an average number or percentage, or fewer than a predetermined threshold number or percentage, of tag corrections during QA review, while as a QA reviewer Jennifer makes more than or equal to an average number or percentage, or more than or equal to a predetermined threshold number or percentage, of corrections to tags applied by others. As a result, report 428C produced for annotation administrator 134 based on Jennifer's performance history may recommend that tagging of content 116 may be performed more efficiently by skipping QA review when Jennifer is the tagging entity.

As further shown in FIG. 4C, the human worker identified as "Pablo" also has a performance history as a tagger as well as a performance history as a QA reviewer. However, as a tagger Pablo receives more than or equal to an average number or percentage, or more than or equal to a predetermined threshold number or percentage, of tag corrections during QA review, while as a QA reviewer Pablo makes fewer than an average number or percentage, or fewer than a predetermined threshold number or percentage, of corrections to the tags applied by others. As a result, report 428C produced for annotation administrator 134 based on Pablo's performance history may recommend that Pablo receive more training before being permitted to perform more QA review.

As also shown in FIG. 4C, the human worker identified as "Javier" has a performance history as a tagger, but has never previously been a QA reviewer. As a tagger, Javier, like Jennifer, receives fewer than an average number or percentage, or fewer than a predetermined threshold number or percentage, of tag corrections during QA review. As a result, report 428C produced for annotation administrator 134 based on Javier's performance history may recommend that Javier be promoted to QA reviewer. Reports 428C may be produced in an automated process by software code 110, executed by processing hardware 104 of computing platform 102.

It is noted that in circumstances in which a particular human worker, when working as a tagger, receives fewer than an average number or percentage, or fewer than a predetermined threshold number or percentage, of tag corrections during QA review, while when working as a QA reviewer makes fewer than an average number or percentage, or fewer than a predetermined threshold number or percentage, of corrections to tags applied by others, reports 428C produced for annotation administrator 134 may alert annotation administrator 134 of the underperformance of the human worker as a QA reviewer. Alternatively in circumstances in which a particular human worker, when working as a tagger, receives more than or equal to an average number or percentage, or more than or equal to a predetermined threshold number or percentage, of tag corrections during QA review, while when working as a QA reviewer makes more than or equal to an average number or percentage, or more than or equal to a predetermined threshold number or percentage, of corrections to tags applied by others, reports 428C produced for annotation administrator 134 may alert annotation administrator 134 of the underperformance of the human worker as a tagger.

It is further noted that in some circumstances, a QA entity may overcorrect annotation tags applied during the tagging process, i.e., make unnecessary corrections during QA review. Such instances may be tracked by annotation administrator 134 to determine whether the overcorrections fit a particular pattern, e.g., the QA entity removes all repeated tags within a segment of content. When a pattern is identified, reports 428B may be produced prompting the QA entity to modify the overcorrection pattern, or to provide a justification for its use.

Referring once again to FIG. 2, flowchart 240 may further include optionally outputting report(s) 128/428A/428B/428C to one or more of the tagging entity performing the tagging process, the QA entity performing the correction process, or annotation administrator 134 (action 245). Report(s) 128/428A/428B/428C may be output to one or more of human tagger 120*a* or automated content annotation system 120*b*, human QA reviewer 124*a* or automated QA system 124*b*, and annotation administrator 134 by software code 110, executed by processing hardware 104 of computing platform 102, for example via communication network 108 and network communication links 118.

In implementations in which the tagging entity is human tagger 120*a*, for example, report 428A may be output by tagging performance evaluation system 100 so as to be delivered to human tagger 120*a* when human tagger 120*a* begins their next tagging process. Alternatively, or in addition, in implementations in which the QA entity is human QA reviewer 124*a*, reports 428B may be output by tagging performance evaluation system 100 so as to be delivered to human QA reviewer 124*b* before human QA reviewer 124*b* begins their next correction process.

Referring to FIG. 1 and flowchart 240 of FIG. 2 in combination, it is reiterated that in some implementations, actions 241, 242, and 243 (hereinafter "actions 241-243"), or actions 241-243 and 244, or actions 241-243, 244, and 245 may be performed by tagging performance evaluation system 100 in a substantially automated process from which human intervention may be omitted.

Thus, the present application discloses tagging performance evaluation systems and methods that overcome the drawbacks and deficiencies in the conventional art. In contrast to conventional approaches to QA as applied to content annotation, which are typically limited to review of tagger performance by human QA reviewers, the present novel and inventive concepts advantageously apply QA principles to each node of the content annotation pipeline. That is to say, in addition to evaluating tagging performance, the novel and inventive approach disclosed in the present application advances the state-of-the-art by assessing the corrections performed during QA review, and using at least one of the tagging evaluation or the assessment of corrections performed during QA to improve one or both of the tagging performance and the correction performance. In addition, the approach disclosed herein further advances the state-of-the-art by using one or both of the tagging evaluation and the assessment of corrections performed during QA to appraise the taxonomy of tags made available for use in annotating content, and to modify the existing taxonomy to further improve tagging performance.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a computing platform including a hardware processor and a system memory storing a software code, an annotation evaluation machine learning model, and a correction assessment machine learning model;

the hardware processor configured to execute the software code to:

receive annotation data identifying a content and a plurality of annotation tags applied to the content in a tagging process performed by a tagging entity;

receive one or more corrections to the plurality of annotation tags, the one or more corrections having been made in a correction process performed by a quality assurance (QA) entity, wherein at least one of (i) the tagging entity is a trained tagging machine learning model communicatively coupled to the system via a communication network, or (ii) the QA entity is a trained tag review and correction machine learning model communicatively coupled to the system via the communication network;

perform, using the annotation evaluation machine learning model and the annotation data, an automated evaluation of the tagging process based on the plurality of annotation tags and the one or more corrections to the plurality of annotation tags;

perform, using the correction assessment machine learning model, the automated evaluation of the tagging process and the annotation data based at least in part on how many corrections are included among the one or more corrections to the plurality of annotation tags;

identify, based on at least one of the automated evaluation of the tagging process or the automated assessment of the correction process, one or more parameters for improving at least one of the tagging process or the correction process; and modify, based on the one or more parameters, one or more of stored weights or stored priorities of at least one of the trained tagging machine learning model communicatively coupled to the system or the trained tag review and correction machine learning model communicatively coupled to the system, wherein the one or more of the stored weights or stored priorities are updated using the one or more parameters as training feedback, the one or more parameters including at least one of a tagging performance history of the tagging entity or a correction history of the QA entity, to provide at least one of an improved tagging machine learning model or an improved tag review and correction machine learning model.

2. The system of claim 1, wherein the tagging entity is the trained tagging machine learning model and the QA entity is the trained tag review and correction machine learning model.

3. The system of claim 1, wherein the trained tagging machine learning model and the trained tag review and correction machine learning model are further improved by modifying a predetermined taxonomy of tags.

4. The system of claim 1, wherein the annotation evaluation machine learning model includes a Support Vector Machine (SVM).

5. The system of claim 1, wherein the hardware processor is further configured to execute the software code to:

produce one or more reports based on the one or more parameters; and output the one or more reports to at least one of the tagging entity performing the tagging process, the QA entity performing the correction process, or an annotation administrator.

6. The system of claim 5, wherein the tagging entity is a human tagger, and wherein one of the one or more reports is delivered to the human tagger when the human tagger begins a next tagging process.

7. The system of claim 5, wherein the QA entity is a human QA reviewer, and wherein one of the one or more reports is delivered to the human QA reviewer before the human reviewer begins a next correction process.

8. A method for use by a system including a computing platform having a hardware processor and a system memory storing a software code, an annotation evaluation machine learning model and a correction assessment machine learning model, the method comprising:

receiving, by the software code executed by the hardware processor, annotation data identifying a content and a plurality of annotation tags applied to the content in a tagging process performed by a tagging entity;

receiving, by the software code executed by the hardware processor, one or more corrections to the plurality of annotation tags, the one or more corrections having been made in a correction process performed by a quality assurance (QA) entity, wherein at least one of (i) the tagging entity is a trained tagging machine learning model communicatively coupled to the system via a communication network, or (ii) the QA entity is a trained tag review and correction machine learning model communicatively coupled to the system via the communication network;

performing, by the software code executed by the hardware processor and using the annotation evaluation machine learning model and the annotation data, an automated evaluation of the tagging process based on the plurality of annotation tags and the one or more corrections to the plurality of annotation tags;

performing, by the software code executed by the hardware processor and using the correction assessment machine learning model, the automated evaluation of the tagging process and the annotation data based at least in part on how many corrections are included among the one or more corrections to the plurality of annotation tags;

identifying, by the software code executed by the hardware processor and based on at least one of the automated evaluation of the tagging process or the automated assessment of the correction process, one or more parameters for improving at least one of the tagging process or the correction process; and modifying, by the software code executed by the hardware processor and based on the one or more parameters, one or more of stored weights or stored priorities of at least one of the trained tagging machine learning model communicatively coupled to the system or the trained tag review and correction machine learning model communicatively coupled to the system, wherein the one or more of the stored weights or stored priorities are updated using the one or more parameters as training feedback, the one or more parameters including at least one of a tagging performance history of the tagging entity or a correction history of the QA entity, to provide at least one of an improved tagging machine learning model or an improved tag review and correction machine learning model.

9. The method of claim 8, wherein the tagging entity is the trained tagging machine learning model and the QA entity is the trained tag review and correction machine learning model.

10. The method of claim 8, wherein the trained tagging machine learning model and the trained tag review and correction machine learning model are further improved by modifying a predetermined taxonomy of tags.

11. The method of claim 8, wherein the annotation evaluation machine learning model includes a Support Vector Machine (SVM).

12. The method of claim 8, further comprising:

producing, by the software code executed by the hardware processor, one or more reports based on the one or more parameters; and outputting, by the software code executed by the hardware processor, the one or more reports to at least one of the tagging entity performing the tagging process, the QA entity performing the correction process, or an annotation administrator.

13. The method of claim 12, wherein the tagging entity is a human tagger, and wherein one of the one or more reports is delivered to the human tagger when the human tagger begins a next tagging process.

14. The method of claim 12, wherein the QA entity is a human QA reviewer, and wherein one of the one or more reports is delivered to the human QA reviewer before the human reviewer begins a next correction process.

* * * * *